United States Patent [19]
Pacheco

[11] Patent Number: 5,398,179
[45] Date of Patent: Mar. 14, 1995

[54] COMPACT FLUORESCENT HARD WIRE ADAPTOR FOR RECESSED CANS

[75] Inventor: Mark A. Pacheco, Plant City, Fla.

[73] Assignee: Innovative Industries of Tampa, Inc., Tampa, Fla.

[21] Appl. No.: 923,576

[22] Filed: Aug. 3, 1992

[51] Int. Cl.$^6$ .............................................. F21S 3/06
[52] U.S. Cl. ...................................... 362/364; 362/260
[58] Field of Search ............... 362/148, 150, 216, 221, 362/260, 364, 365

[56] References Cited

U.S. PATENT DOCUMENTS

| | | | |
|---|---|---|---|
| 4,459,648 | 7/1984 | Ullman | 362/404 X |
| 4,520,436 | 5/1985 | McNair et al. | 362/260 X |
| 4,922,393 | 5/1990 | McNair | 362/364 X |
| 5,073,845 | 12/1991 | Aubrey | 362/260 X |
| 5,075,831 | 12/1991 | Stringer et al. | 362/365 |

OTHER PUBLICATIONS

Halo Lighting Catalog, Author Unknown p. 55 published Date Unknown, Cooper Industries Inc.

Primary Examiner—Stephen F. Husar
Attorney, Agent, or Firm—Pettis & McDonald

[57] ABSTRACT

A compact fluorescent hard wire adaptor for use with existing recessed incandescent can fixtures includes a mounting plate with an electronic ballast which is high power factor and low harmonic. A lampholder is provided mounted in the center of the mounting plate for the insertion of the compact fluorescent lamp. The mounting plate is provided with an arm for securing inside a typical recessed can. The mounting plate is provided with holes for mounting a reflector. Special wire connectors are provided for simple attachment.

10 Claims, 2 Drawing Sheets

COMPACT FLUORESCENT HARD WIRE ADAPTOR FOR RECESSED CANS

BACKGROUND OF THE INVENTION

1. Field of the Invention

The subject invention generally pertains to a lighting kit for adapting incandescent downlights to high efficiency, high power factor compact fluorescent lighting, permanently wired.

2. Description of Related Art

Many current retro-fit kits for adapting incandescent downlights to fluorescent incorporate a screw in type adaptor which would screw into an existing medium base socket and also employ low efficiency and low power factor magnetic ballasts. The disadvantages of such retro-fit adaptors is that they are easily removed and replaced back with incandescent lighting which defeats the original energy efficiency purpose. Other disadvantages of other devices are difficulty in wiring because the entire fixture must be completely disassembled and replaced with all new components. Existing retro-fit kits which involve a fluorescent ballast either locate it outside the recessed can, multiplying the difficulty of installation, or above the lampholder, reducing ballast heat dissipation and resulting in shorter ballast and lamp life.

SUMMARY OF THE INVENTION

To avoid the limitations and problems with present designs of retro-fitting, it is an objective of the subject invention to allow for the replacement of the existing incandescent portion of the can by simply removing one wing nut, cutting two wires and then installing the subject device by simply attaching the wiring using special clamp on wire connectors which do not require any special tools or stripping of the wire. Another objective of the invention is to provide a quick and easy installation. Another objective is to prevent the device from being removed and replaced back with an incandescent fitting which would defeat the energy efficient qualities. Another objective is that the device provides for replaceable lamps. Another objective is to locate the ballast below the plane of the lamp to reduce the ballast temperature and increase ballast and lamp life. These and other objects of the invention are provided by a novel compact fluorescent hard wire adaptor for recessed cans that includes a high power factor, low harmonic electronic ballast which is light weight. The subject invention is provided with a compact fluorescent socket. Two leads are provided from the ballast for connection to the power system by special wiring devices which do not require special tools or stripping of the wires which allows simplified and permanent installation.

DETAILED DESCRIPTION

Figure 1:
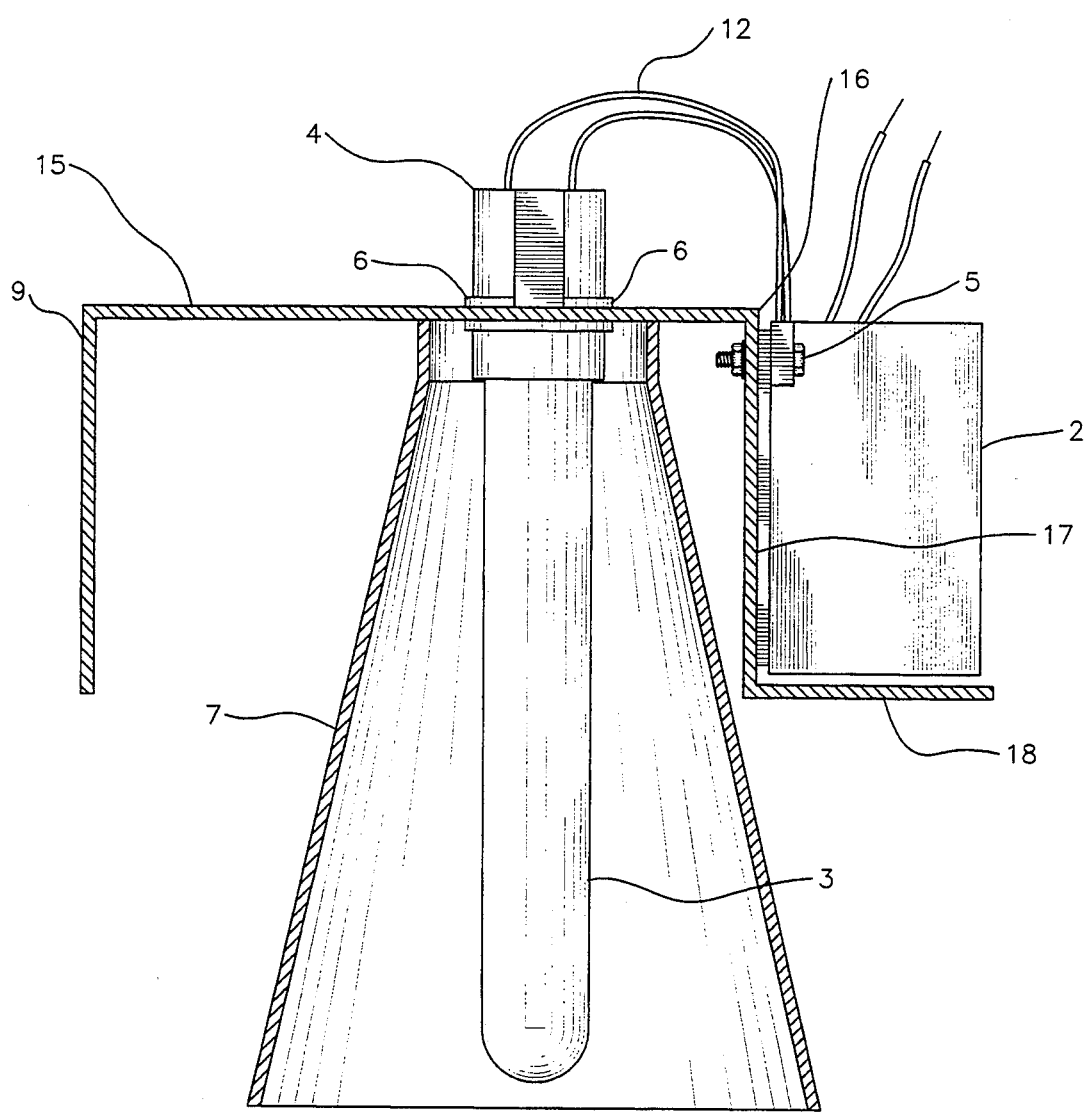
FIG. 1 is a front view of the compact fluorescent hard wire adaptor for recessed cans according to the subject invention.
Figure 2:
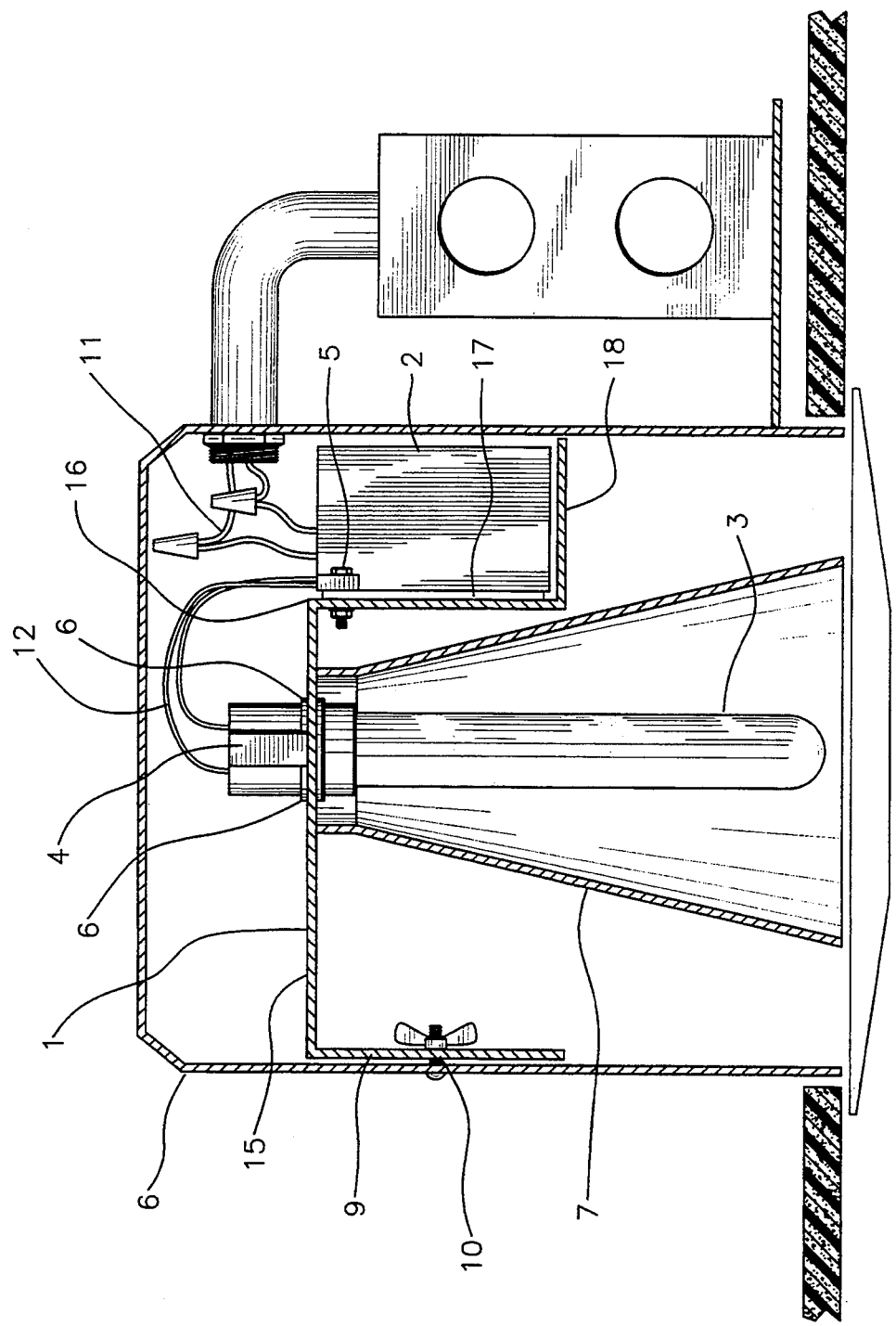
FIG. 2 is a view from the left side of the compact fluorescent hard wire adaptor for recessed cans according to the subject invention.

Referring to FIG. 1, the compact fluorescent, hard wire adaptor for recessed can light fixtures consists of a metal plate (1), specifically formed to fit a number of typical incandescent recessed fixtures, with a central aperture (13). The plate (1) is substantially circular and has a circular perimeter (15) about its central point or axis except for flat portions (16) where the mounting bar (9) and the ballast (2) are attached.

The metal plate (1) extends downwards on one side to form a ballast support surface (17), below which the plate continues outward (18).

It includes a fluorescent ballast (2) which is an electronic ballast designed to specifically drive a compact fluorescent lamp. The ballast (2) has internal circuitry which drives the lamp in such a way to provide a high power factor, low harmonic distortion circuit for the highest efficiency. The ballast (2) is located below the plane of the lampholder (4) to reduce heat and to allow the unit to fit completely into a recessed can so a 26 watt lamp will fit.

A special lampholder (4) is mounted to the plate (1) by snap fit into existing holes (6) in the plate (1).

The ballast (2) is attached to the plate (1) using rivets or screws (5).

The mounting bar (9) of the plate (1) is provided with a slot (10) which allows for height adjustment inside an existing recessed can. The slot is designed for passage of a screw attaching the invention to a recessed can. A reflector (7) can also be provided which can be attached to the plate (1) by spring clips or other mechanical means. The reflector (7) allows for focusing of the light, and can be either metal or glass.

The wiring (11) from the ballast (2) connected to existing wiring of a recessed can by the use of two crimp connectors which will connect the wiring and make the installation permanent.

The ballast (2) is connected to the lampholder (4) by wiring (12).

Although the invention is described with the respect to some preferred embodiments, modifications thereto will be apparent to those skilled in the art, and therefore the scope of the invention is to be determined by referenced to the claims which follow.

I claim:

1. An adaptor for a light fixture comprising:
   a. a lampholder support surface having an upper portion surrounding a central aperture;
   b. a mounting bar downwardly extending from said lampholder support surface;
   c. a ballast support surface downwardly extending from said lampholder support surface;
   d. a lampholder mounted to said lampholder support surface, said holder being disposed substantially above said central aperture; and
   e. a ballast attached to said ballast support surface substantially below and spaced apart from said lampholder, said ballast electrically connected to said lampholder.

2. The adaptor for a light fixture of claim 1, further comprising a reflector attached substantially below said lampholder support surface, axially aligned with said central aperture.

3. The adaptor for a light fixture of claim 2, wherein said reflector is made of metal.

4. The adaptor for a light fixture of claim 2, wherein said reflector is made of glass.

5. An adaptor for a light fixture comprising:
   a. a plate having an upper substantially horizontal portion substantially in the form of a circle surrounding a central aperture, said plate having a perimeter, said perimeter having a first and second flat portion;

b. a mounting bar extending downwardly from said first flat portion, having in the center a slot;

c. a ballast support surface extending downwardly from said plate along said second flat portion, and turning substantially horizontally at a point along said ballast support surface, having an upper, two vertical, and an outer side, said outer side being shaped in an arc-like curve having the same axial radial center as said plate;

d. a lampholder mounted to said lampholder support surface, said holder being disposed substantially above said central aperture; and e. a ballast attached to said ballast support surface substantially below and spaced apart from said lampholder, said ballast electrically connected to said lampholder.

6. The adaptor for a light fixture of claim 5, wherein said lampholder is attached to said plate by snap fit.

7. The adaptor for a light fixture of claim 5, further comprising a reflector attached substantially below said plate.

8. The adaptor for a light fixture of claim 7, wherein said reflector is made of metal.

9. The adaptor for a light fixture of claim 7, wherein said reflector is made of glass.

10. An adaptor for a light fixture for a fluorescent light comprising:

a. a metal plate having an upper horizontal portion substantially in the form of a circle surrounding a central aperture, said metal plate having a perimeter, said perimeter having a first and second flat portion;

b. a mounting bar extending downward from said first flat portion having a slot;

c. a ballast support surface extending downward from said plate along said second flat portion, and turning horizontally at a point along said ballast support surface, said ballast support surface having an upper, two vertical, and an outer side, said outer side being shaped in an arc having the same axial radial center as said metal plate;

d. a lampholder for a fluorescent light mounted to said metal plate, being disposed substantially above said central aperture;

e. a ballast screw-mounted to said ballast support surface substantially below and spaced apart from said lampholder, said ballast electrically connected to said lampholder by four wires; and f. a metal reflector attached below said metal plate radially aligned with said central aperture.

* * * * *